May 26, 1942. W. PFEIFFER 2,284,396
GAUGING AND SAMPLING APPARATUS FOR PRESSURE TANKS
Filed April 1, 1940 2 Sheets-Sheet 1
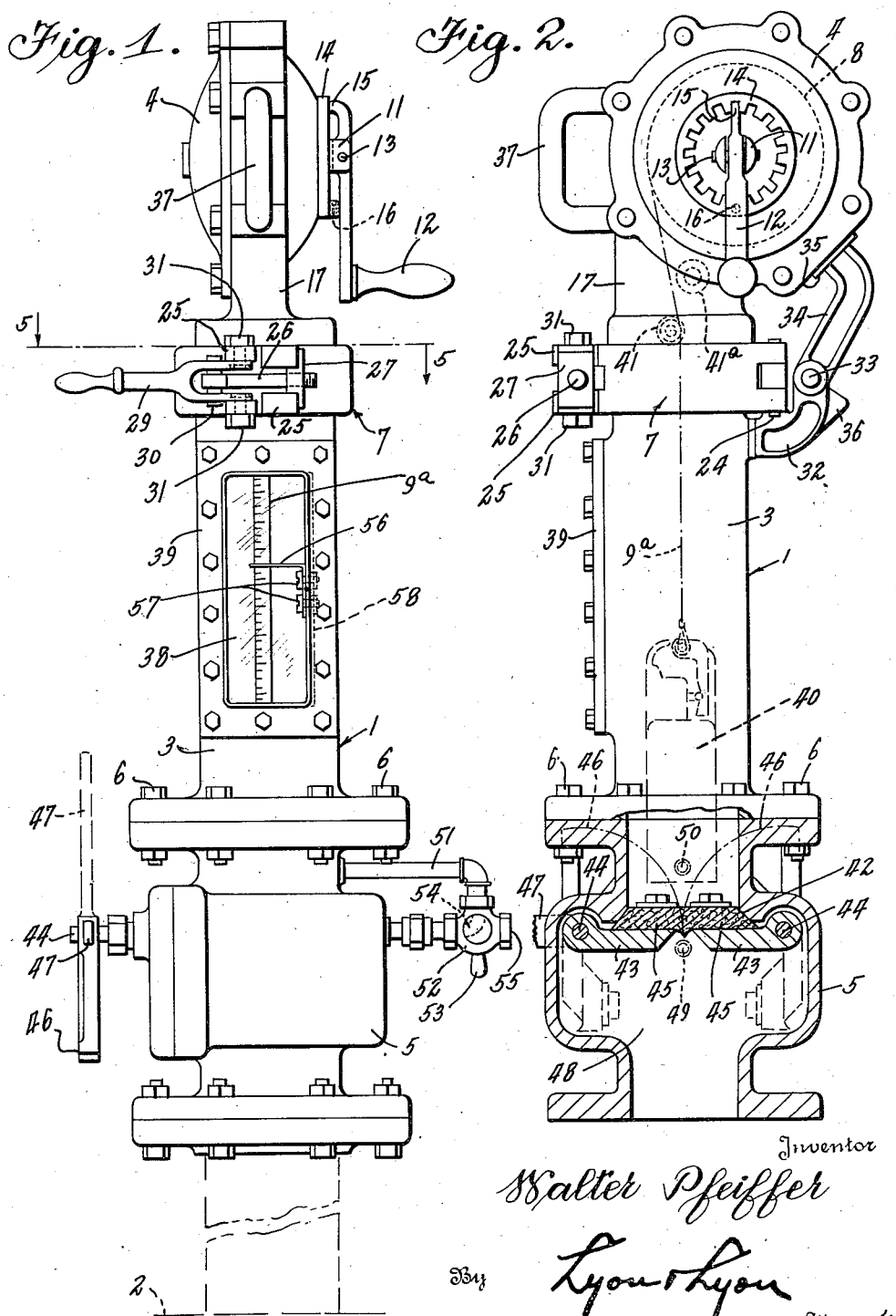
Inventor
Walter Pfeiffer
By Lyon & Lyon
Attorneys May 26, 1942.  W. PFEIFFER  2,284,396
GAUGING AND SAMPLING APPARATUS FOR PRESSURE TANKS
Filed April 1, 1940  2 Sheets-Sheet 2
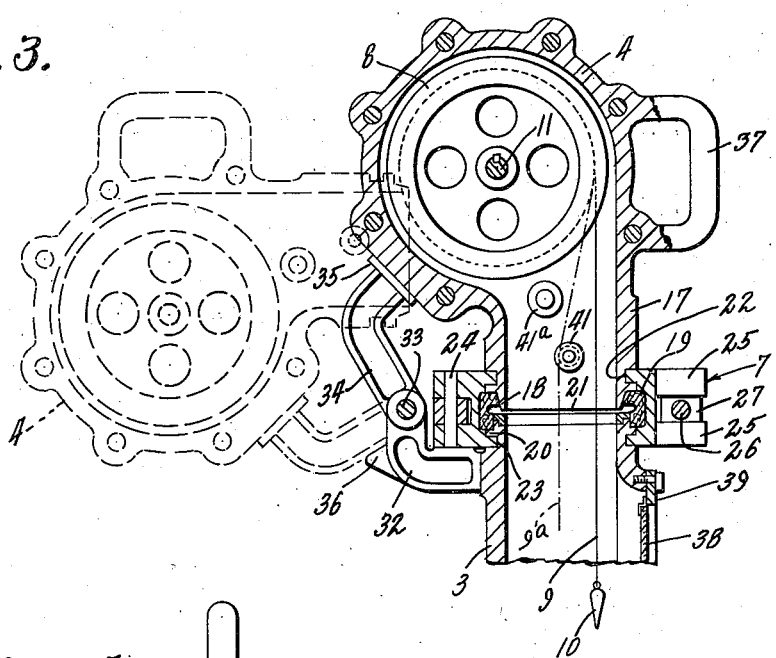
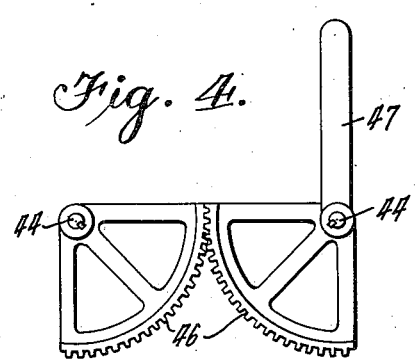
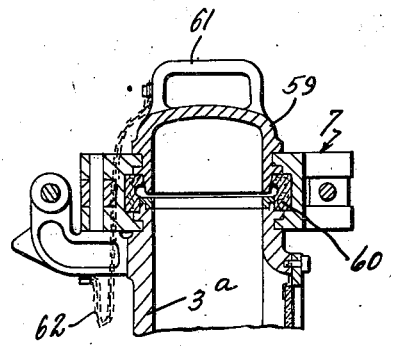
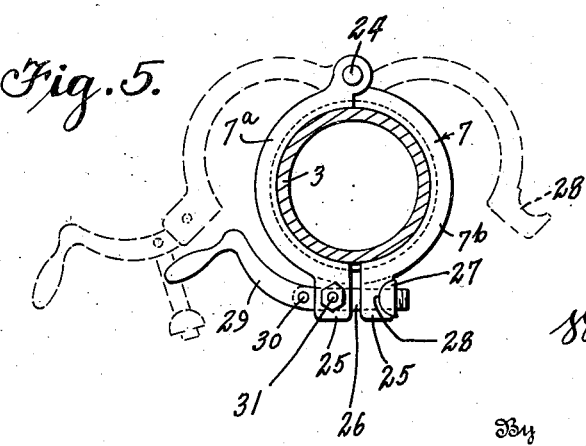
Inventor
Walter Pfeiffer
By Lyon & Lyon
Attorneys Patented May 26, 1942

2,284,396

UNITED STATES PATENT OFFICE 2,284,396

GAUGING AND SAMPLING APPARATUS FOR PRESSURE TANKS

Walter Pfeiffer, Huntington Park, Calif., assignor to Frank V. Long, doing business as The Vapor Recovery Systems Company, Compton, Calif.

Application April 1, 1940, Serial No. 327,242

3 Claims. (Cl. 33—126.7)

This invention relates to a gauging and sampling apparatus that is particularly useful for gauging the depth of liquid in closed tanks containing the liquid with vapor or gas above the liquid; in other words, tanks containing more or less volatile liquids with their vapors above the same under more or less pressure.

One of the objects of the invention is to provide simple gauging or sampling apparatus for use on such tanks constructed in such a way that the operations of gauging or sampling can be conducted without necessitating the loss of any substantial amount of the vapors from the tank.

In gauging the liquid level in such tanks, it is the usual practice to employ a flat tape and to apply a substance, for example, chalk to a portion of the tape, which would lie substantially at the level of the liquid when the plumb-bob carried by the tape, is located on the datum plate at the bottom. After chalking or painting the tape, the plumb-bob is run down to the datum plate, at which time the liquid level will become indicated on the chalked or painted portion of the tape, enabling a correct reading of the depth to be taken, when the tape is wound back.

One of the objects of this invention is to construct the apparatus in such a way as to facilitate this chalking or painting operation without necessitating the escape of any substantial amount of vapor from the vapor space in the tank.

The apparatus includes a housing that is mounted on the tank cover, or roof, and through which the tape is operated into or out of the tank in gauging the liquid, or in taking samples. These tanks are often of considerable size, and the covers may be subject to slight up or down movements due to changes in the internal pressure or other causes. One of the objects of this invention is to provide the apparatus with indicating means to be set by a worker when the apparatus is first put into use on the tank to indicate the distance or depth from the datum plate at the bottom of the tank, to a set indicator. This measurement can be recorded, and hence any movements of the cover up or down can be indicated by comparison of the reading at this set marker, or indicator, with the original recorded measurement.

In practice, sometimes the gauging points of several adjacent tanks may be located near each other. Under such conditions, it may be desirable to provide a single tape reel and tape to be used in gauging the liquid levels in the different tanks in succession. One of the objects of the invention is to provide a construction for this apparatus, which will facilitate employing the same reel and measuring tape for the different tanks; more specifically to provide a readily disconnectible but gas-tight connection for the reel-housing.

Further objects of the invention will appear hereinafter.

The invention consists in the novel parts and combination of parts to be described hereinafter, all of which contribute to produce an efficient gauging and sampling apparatus for pressure tanks.

A preferred embodiment of the invention is described in the following specification, while the broad scope of the invention is pointed out in the appended claims.

In the drawings:

Fig. 1 is a front elevation of a gauging and sampling apparatus embodying my invention.

Fig. 2 is a side elevation of the apparatus shown in Fig. 1 as viewed from the right side, but showing the lower portion of the apparatus in cross-section so as to illustrate the preferred construction for the sealing valve for sealing off the vapors in the tank while the tape is being painted or chalked. In this view in dotted lines, is illustrated a sampler that is adapted to be used with this apparatus.

Fig. 3 is a vertical section showing the upper end of the apparatus, and in dotted lines illustrating how the reel-housing can be swung over to an inoperative position so as to clear the upper end of the main housing through which the tape is moved up and down.

Fig. 4 is a view illustrating means that I may employ for operating the sealing valve.

Fig. 5 is a horizontal section taken about on the line 5—5 of Fig. 1, and illustrating a collar that I prefer to employ for making a gas-tight connection to the upper end of the main housing either for securing a cap on the same or for securing the reel-housing.

Fig. 6 is a vertical section corresponding to Fig. 3, but illustrating the reel housing as removed, and illustrating the clamping ring securing a permanent cap on the main housing.

In practicing the invention I provide a housing 1 adapted to be secured over an opening in the cover of the tank indicated by the line 2, and this housing is preferably formed of several sections including a main housing or body 3, a reel-housing 4, and a valve housing 5, the main housing 3 being permanently secured by bolts 6 or other means to the flange at the upper side of the valve housing. The reel-housing 4 is preferably removably held in place by means of a readily disconnectible connection 7 that will be described hereinafter.

Within the reel-housing a reel 8 is mounted (see Fig. 3) carrying a measuring line preferably in the form of a flat tape indicated by the dotted line 9a. When this tape is being used for gauging the depth of liquid in the tank, it will be provided with a plumb-bob or "bob" 10. The reel is carried on a shaft 11 that extends to the exterior, and is provided with a crank 12 for rotating the same. This crank is preferably mounted for pivotal rotation on the shaft by means of a through pin 13 (see Fig. 2) and the usual means is provided for enabling the shaft 11 to be held in any position in which it is left. This is illustrated as including an internally notched ring 14 with which a tongue 15 on the end of the crank cooperates. By pressing inwardly on the lower end of the crank as illustrated in Fig. 1, a coil spring 16 carried under the crank 12 can be compressed so as to release the tongue 15 and permit the crank to be rotated. As soon as the crank is released, the spring will swing the handle end of the crank outwardly and move the tongue into engagement with one of the notches of the ring 14.

The lower portion of the reel housing 4 is formed with a neck 17 (see Fig. 3) that is adapted to make a sealed connection with the upper end of the main housing 3. However, this sealed connection must be constructed so that it can be readily disconnected. In order to accomplish this, I prefer to construct the lower end of the neck 17 with a tapered tip 18 that is adapted to seat in the upper opening of the packing ring 19, the lower portion of which is supported on a flange 20 at the upper end of the housing 3. The neck 17, however, does not engage the upper end of the housing 3, so that a space 21 is formed that admits the vapor pressure against the inner face of the packing ring so that this pressure assists in forcing the packing ring out against the connection 7 that envelops it. This connection at the same time, rigidly secures the neck 17 in place, for which purpose the lower end of the neck 17 is formed with an annular groove 22 in which a flange at the upper portion of the connection 7 seats. A similar groove 23 is formed near the upper end of the housing 3 to engage a lower flange on the connection 7. This connection 7 is preferably in the form of a split ring composed of two sections 7a and 7b (see Fig. 5) that are connected together by a pivot pin 24, and which are formed with substantially radial lugs 25 on their free sides, at which point the connection or clamping collar 7 can be clamped up when desired. The connection for this purpose preferably includes a bolt 26 having a threaded end carrying a saddle 27 rounded on its inner face to be received in a half round socket 28 formed on the outer face of one of the lugs 25. The lugs 25, of course, are bifurcated so as to permit this bolt 26 to swing into the space between the forks, and with the saddle 27 inserted in the socket 28. A lever 29 to which the bolt 26 is pivotally attached at 30, is then swung around on its pivot pin 31 that connects it to one of the lugs 25 so as to bring into action a toggle effect, with the axis of the pin 30 located slightly inside of a line joining the axis of the saddle 27 with the axis of the pin 31. The reel-housing 4 is movably mounted on the upper end of the main housing 3 so as to facilitate its being swung out of the way after the clamping ring 7 has been swung open as indicated by the dotted lines in Fig. 5. In order to accomplish this, the upper end of the housing section 3 is provided with an upwardly offset arm 32 that is connected by a pivot pin 33 or bolt, to a corresponding downwardly offset arm 34 that extends down from a pad or flat seat 35 formed on the side of the housing 4 in a 45° position. After the collar 7 has been disconnected, the reel-housing 4 can swing over to a position in which it is indicated in dotted lines in Fig. 3, at which time the arm 34 will be supported on a rest 36 consisting of a lug projecting outwardly from the arm 32 adjacent its bend. The housing 4 may be provided with an integral handle 37 for facilitating these movements.

The tape 9 falls directly from the side of the reel, unguided so that it will lie near a window covered with glass 38 on the forward side of the housing section 3 held in place by a removable frame 39.

However, when the tape is being used to support the sample taker 40 indicated in dotted lines in Fig. 2, the tape is guided over a guide roller 41 that enables the tape to run substantially on the central axis of the chamber within the housing 3.

In order to enable the apparatus to be employed without the escape of any substantial quantity of vapors from the tank, the valve housing 5 carries valve closure means preferably mounted so that in operation it comes upon its seat 42 by moving away from the interior of the tank. This valve closure means is preferably constructed so that it can close against the tape without injuring the tape, or valve; and for this purpose it involves the use of soft packing on the closure, with a substantially straight transverse edge or face which engages one side of the tape and co-operates with the soft packing on the other side of the tape to form a vapor seal around the tape. The tape impresses or deforms the packing to make space for itself. While this valve may be constructed, of course, in various ways, in the present instance it comprises two gates 43 secured on oppositely disposed shafts 44 and capable of swinging down to an open position as indicated by the dotted lines in Fig. 2. In the closed position of these gates, blocks 45 of packing material seat against the inclined faces of the seat 42, so as to pack the same gas-tight. Also the metal of the gates 43 is cut short at their adjacent edges, so that the packing blocks 45 contact each other substantially as illustrated in Fig. 2.

The two gates 43 are operated from the exterior and in unison, preferably through the agency of two toothed segments 46 (see Fig. 4) the teeth of which engage each other. For operating the valve, a lever 47 may be provided which, if desired, may be integral with one of the segments. In the closed position of the valve shown in Fig. 2, this lever should be in a horizontal position. In Fig. 1 it is indicated in dotted lines in its vertical position, that corresponds to the open position of the valve.

A bypass is provided for connecting the valve chamber 48 below the valve with the interior of the housing 3 above the valve. This bypass connection is made through openings 49 and 50 as indicated in Fig. 2, and comprises a pipe connection 51 provided with a three-way valve or cock 52. In Fig. 1 the port of the plug of this valve, is indicated in dotted lines and shown in the position that opens communication through the bypass. The valve is operated by a handle 53, and if this handle 53 is swung up to the left, the port 54 through the valve, will evidently vent the space above the valve gates 43 to the atmosphere through the valve outlet 55.

The window and glass 38 are provided so as to facilitate reading the scale on the tape. They are also provided, however, for another purpose, which is to enable more than the length of the unit of measure to be seen through the window. For this reason the window should be considerably over a foot in length. The reason for this is that buyers, particularly foreigners, in buying gasoline or other liquids in storage in tanks, are frequently suspicious, and sometimes fear that the measuring scale will not have the proper numbering upon it.

In setting up the apparatus, it is desirable to have means for indicating the distance from the datum plate to the reading point on the scale or tape. This is necessary in order to indicate whether any changes have occurred in the position of the cover on which the apparatus is mounted. For this purpose I provide a marker 56 in the form of an angle clip which is adjustably mounted on the side of the window through the medium of two bolts 57 running in a slot at 58. When the apparatus is set up, the man installing it should run down the "bob" until it strikes the datum plate, and then set the marker 56 to an inch mark near the middle of the window and secure the same. A record should then be made preferably on a plate attached somewhere on the apparatus indicating what this reading is. If any changes in the position of the cover take place, the reading at the marker plate 56 will change. It should be understood, however, that this reading at the marker plate does not in any way affect the accuracy of the reading of the tape when measuring the depth of liquid in the tank. If it is desired, the reel-housing 4 could be detached at the bolt 33 to use it at some other point, in which case it would be necessary to provide a tight cover for the upper end of the housing 3. In order to enable this to be accomplished, I provide a housing cap 59 (see Fig. 6) which has the same form as the lower end of the reel-housing 4, enabling it to cooperate with a sealing ring 60 and a detachable clamping ring or collar 7 similar to these parts already described in connection with Fig. 3. The cap 59 may be provided with a handle 61 and may be connected by a chain 62 to some part of the housing 3a.

The general mode of operation of the apparatus will now be described.

In gauging the level of a liquid in a tank, the tape 9 should be chalked for a space of about two feet on each side of the approximately known depth of liquid in the tank. In order to enable the tape to be chalked or painted, the valve gates 43 should be opened by means of the lever 47, and the "bob" and tape run down into the tank until the number indicating the approximate level or depth of the liquid, arrives at the window 38. The gates 43 should then be swung into their closed position, after which the bypass valve 52 should be swung over to its other position (other than that shown in Fig. 1) to vent the interior of the housing 3 and the housing 4 to the atmosphere. The gauger would now remove the clamping collar 7 and swing the reel-housing 4 over to one side and into the position in which it is indicated in dotted lines in Fig. 3. He would then pick up the tape and chalk it or paint it at the desired location.

When the reel-housing is thrown over to this side position, the tape can be guided over the guide roller 41a that is similar to the roller 41.

After chalking or painting the tape, the gauger can swing the reel-housing back into its closing position and secure the collar 7 to it again so as to make a tight closure between this housing and the main housing 3. The gauger should then rotate bypass valve 52 to close vent to atmosphere and equalize pressure above and below gates 43, and let the "bob" down until he feels it on the datum plate. He can then reel back until he brings the chalked part of the tape into view at the window, where he can then read the indication for the level of the liquid in the tank.

In using the apparatus with a sample taker such as indicated at 40 in Fig. 2, the tape is preferably run over the guide roller 41 as indicated in dotted lines in Fig. 3. This holds the tape substantially on the central axis of the housings, and will give clearance for the sample taker as it is run up or down in the housing. Before using the sample taker, the gates 43 should be closed and the interior of the housing vented through the bypass valve 52. The reel-housing should then be disconnected and swung to one side so as to permit the sample taker to be attached to the tape. The reel-housing is then closed, and bypass valve 52 is rotated to equalize pressure above and below gates 43. The sample taker should then be run down into the interior of the tank to the desired level as would be indicated by the reading at the marker 56, and the tape jerked or otherwise operated in order to take the sample at the desired level. The sample taker would then be pulled up to a position above the gates 43, which would then be closed, the bypass valve 52 rotated to vent housings 3 and 4 to atmosphere; then the reel-housing 4 is thrown open to permit the sample taker to be taken off of the tape. After doing this and replacing the reel-housing, the bypass valve 52 should be rotated back to establish communication between the spaces above and below the valve gates, and the valve gates should then be swung down to their open position, which is the position in which they should normally rest.

Many other embodiments of the invention may be resorted to without departing from the spirit of the invention.

What I claim is:

1. In apparatus for gauging the depth of liquid in a tank under pressure, the combination of a housing to seat over an opening in the tank cover, a reel with gauge-tape rotatably mounted in the housing, a substantially gas-tight valve for sealing off the housing below the reel, including a pair of hingedly supported gates with compressible packing means, said packing means having substantially straight free edges closing against the tape and impressed by the tape, to form space for the tape between said edges, and operating to make a substantially gas-tight closure around the tape, and a reading window in the side of the housing for reading the tape.

2. In apparatus for gauging the depth of liquid in a tank under pressure, the combination of a housing to seat over an opening in the tank cover, a reel with gauge-tape rotatably mounted in the housing for carrying a plumb-bob, a substantially gas-tight valve for sealing off the housing below the reel and including a gate mounted to swing on a substantially horizontal axis, packing means carried by the gate for engaging the tape on one side; and packing means with an edge for engaging the tape on the opposite side cooperating with the gate, and deformed by the tape to form a gas-tight seal around the tape, said gate operating in its open position to permit the plumb-bob to pass up into the housing from below.

3. In apparatus for gauging the depth of a liquid in a tank under pressure, the combination of a housing mounted on the tank, a reel carried within the housing with tape to carry a plumb-bob and capable of being run down through the housing to gauge the depth of liquid in the tank, a valve below the reel including a valve seat and a movable valve closure mounted so as to come upon said seat by movement away from the interior of the tank so that the pressure of the gas in the tank will maintain the valve on its seat, packing means associated with the valve closure for engaging opposite sides of the tape, and deformed by the tape, to prevent leakage of gas past the tape when the same has been run down into the tank, and a bypass including a valve capable of opening communication between the interior of the housing below the valve closure and the interior of the housing above the valve closure.

WALTER PFEIFFER.